US011429955B2

(12) United States Patent
Bellee et al.

(10) Patent No.: US 11,429,955 B2
(45) Date of Patent: Aug. 30, 2022

(54) METHOD FOR SECURING A TRANSACTION FROM A MOBILE TERMINAL

(71) Applicant: Orange, Issy-les-Moulineaux (FR)

(72) Inventors: Arnaud Bellee, Baron-sur-Odon (FR); Antoine Dumanois, Boulogne Billancourt (FR)

(73) Assignee: ORANGE, Issy-les-Moulineaux (FR)

( * ) Notice: Subject to any disclaimer, the term of this patent is extended or adjusted under 35 U.S.C. 154(b) by 265 days.

(21) Appl. No.: 16/063,459

(22) PCT Filed: Dec. 14, 2016

(86) PCT No.: PCT/FR2016/053437
§ 371 (c)(1),
(2) Date: Jun. 18, 2018

(87) PCT Pub. No.: WO2017/103484
PCT Pub. Date: Jun. 22, 2017

(65) Prior Publication Data
US 2018/0374084 A1 Dec. 27, 2018

(30) Foreign Application Priority Data

Dec. 18, 2015 (FR) ...................................... 1562797

(51) Int. Cl.
*G06Q 20/36* (2012.01)
*G06Q 20/32* (2012.01)

(52) U.S. Cl.
CPC ..... *G06Q 20/3674* (2013.01); *G06Q 20/3227* (2013.01); *G06Q 20/3229* (2013.01); *G06Q 20/3263* (2020.05); *G06Q 20/36* (2013.01)

(58) Field of Classification Search
CPC ........... G06Q 20/3278; G06Q 20/3674; G06Q 20/3229; G06Q 20/325; G06Q 40/12;
(Continued)

(56) References Cited

U.S. PATENT DOCUMENTS 5,589,855 A * 12/1996 Blumstein ........... G06F 3/04847
235/379
6,598,032 B1 * 7/2003 Challener ............ G06Q 20/382
705/64
(Continued)

FOREIGN PATENT DOCUMENTS

CN 104602224 A 5/2015
WO 2013092796 A1 6/2013

OTHER PUBLICATIONS

English translation of the Written Opinion of the International Searching Authority dated Feb. 22, 2017 for corresponding International Application No. PCT/FR2016/053437, filed Dec. 14, 2016.
(Continued)

*Primary Examiner* — Johann Y Choo
(74) *Attorney, Agent, or Firm* — David D. Brush; Westman, Champlin & Koehler, P.A.

(57) ABSTRACT

A method for implementing a transaction from a mobile terminal, which includes a data-processing module and a security element on which a plurality of transaction modules are stored. Each transaction module is associated with an electronic card and suitable for authorizing a transaction on behalf of the electronic card when activated upon presentation of an associated confidential code. The method includes the security element: (a) receiving a transaction request targeting one transaction module of the plurality of transaction modules; (b) receiving, by an authentication module also stored on the security element, a unique valid authentication code obtained via an interface of the terminal, the authentication module storing the confidential codes associated with each of the transaction modules, and being itself capable of being activated upon presenting the authentication code; (c) activating the targeted transaction module by
(Continued)

the authentication module, and transmitting a transaction authorization in response to the transaction request.

14 Claims, 3 Drawing Sheets

(58) Field of Classification Search
CPC ............... G06Q 30/0633; G06Q 20/32; G06Q 20/3227; G06Q 20/36
See application file for complete search history.

(56) References Cited

U.S. PATENT DOCUMENTS

| | | |
|---|---|---|
| 9,722,971 B2 | 8/2017 | Goncalves |
| 2004/0267665 A1* | 12/2004 | Nam ...................... G06Q 20/32 705/41 |
| 2007/0206743 A1* | 9/2007 | Chang ................... H04M 15/00 379/127.03 |
| 2013/0124413 A1* | 5/2013 | Itwaru .................... G06Q 20/20 705/44 |
| 2014/0081872 A1* | 3/2014 | Papagrigoriou ..... G06Q 20/353 705/71 |
| 2015/0020160 A1* | 1/2015 | Goncalves ......... G06Q 20/3227 726/3 |
| 2015/0235212 A1 | 8/2015 | Ortiz et al. |

OTHER PUBLICATIONS

International Search Report dated Feb. 22, 2017 for corresponding International Application No. PCT/FR2016/053437, filed Dec. 14, 2016.
Written Opinion of the International Searching Authority dated Feb. 22, 2017 for corresponding International Application No. PCT/FR2016/053437, filed Dec. 14, 2016.

* cited by examiner

METHOD FOR SECURING A TRANSACTION FROM A MOBILE TERMINAL

CROSS-REFERENCE TO RELATED APPLICATIONS

This Application is a Section 371 National Stage Application of International Application No. PCT/FR2016/053437, filed Dec. 14, 2016, the content of which is incorporated herein by reference in its entirety, and published as WO 2017/103484 on Jun. 22, 2017, not in English.

GENERAL TECHNICAL FIELD

The present invention relates to the field of transactions using mobile terminals.

More precisely, it relates to a method for implementing a transaction from a first mobile terminal on which an electronic card is computerized.

PRIOR ART

Payment systems referred to as "computerized" (or "virtualized") have appeared recently, for carrying out transactions (in particular payments) by means of a bank card computerized on an electronic medium, for example a mobile terminal, capable of carrying out a payment at a distance or in proximity with a payment terminal, for example of contactless type (NFC).

The virtualization method used by these payment systems is, for example, the following: the client, or holder of the card, enters the bank information inscribed on the card thereof in an application of the terminal, which application is controlled by an aggregator, or provider, of the payment service. For example, according to a known method, the holder photographs the bank card thereof and provides the visual cryptogram (the security code that is typically located on the back). Alternatively, the holder manually inputs this information, which information is essential for identifying the cardholder during a transaction.

The bank that is responsible for the bank account associated with the card validates the virtualization if it considers that the person who has re-entered the information is actually the client possessing the card, or holder. Where applicable, loaded on the terminal are virtualization data corresponding to the card, or token, which data is encrypted using encryption keys known only by the bank organization responsible for the card (or by the organization managing the bank scheme by delegation of the bank organization responsible for the card).

It is noted that, for a computerized bank card, several transaction modules can be available in the token, in particular if this card is associated at the same time with several payment networks, for example Visa® and CB® in France, just like for a physical bank card.

The data of a transaction module of a token (virtualization data of a bank card) comprise:
  an identifier,
  an additional code (generally the visual cryptogram);
  a PIN, that is to say a personal confidential code, in general having 4 digits.

The third datum must be known to the user, and the latter will indeed be asked for it to validate any transaction using the computerized card (in any case from a certain value).

To facilitate the management of a plurality of computerized cards, the use of unified-electronic-wallet applications, called a "wallet", has been proposed. Such an application is described, for example, in the document US2015235212. If the user wishes to use one of the cards thereof for a transaction, it is sufficient for the latter to open the wallet as a single payment application, and the latter proposes thereto to choose from the cards (and more particularly from the transaction modules of the cards) the one that the user wishes to use, and the latter only has to enter the associated PIN code. Wallets also allow additional functions such as changing a PIN code.

It is noted that the number of PIN codes to be memorized can be quite high if the user has computerized several cards. In addition, as a single card can be associated with several modules of a token, this can become complex if the user wants to change PIN code. The latter may inadvertently set different PIN codes for several modules associated with the same card, and not understand why the code thereof no longer works if the latter carries out a purchase for example via Visa instead of the French CB, or vice versa.

This is all the more critical since, if the user makes a mistake three times with a PIN code, this blocks the associated module (and therefore partially blocks the card thereof, which can be very troublesome for the user), and it is then necessary to restart an entire cryptographic data generation procedure after verification of the identity of the client (the latter must generally go to the bank).

It would therefore be desirable to have a new solution for controlling the modules of the tokens making it possible to facilitate the management of the PIN codes.

PRESENTATION OF THE INVENTION

The present invention thus relates, according to a first aspect, to a method for implementing a transaction from a mobile terminal comprising a data processing module and a security element on which a plurality of transaction modules is stored, each transaction module being associated with an electronic card, and suitable for authorizing a transaction on behalf of said electronic card when the transaction module is activated upon presentation of an associated confidential code, the method being characterized in that it comprises the implementation, by the security element, of steps of:
  (a) receiving a transaction request targeting a transaction module of said plurality;
  (b) receiving, by an authentication module also stored on the security element, a valid unique authentication code obtained via an interface of the terminal, the authentication module storing the confidential codes associated with each of the transaction modules, and being itself activatable upon presentation of said authentication code;
  (c) activating, by the authentication module, the targeted transaction module, and transmitting a transaction authorization in response to said transaction request.

The use of a security element such as a subscriber identification card for implementing an authentication module which governs the transaction modules makes it possible to maintain the maximum level of security while removing the need for managing multiple PINs.

In addition, the risk of blocking modules of a token in the event of wrong entry of a confidential code is avoided, and security flaws related to the user are avoided: the latter no longer necessarily knows the confidential code or codes, which therefore remain secret, and which prevents card thefts.

According to other advantageous and non-limiting features:

the data processing module implements a module for managing the transaction modules, the step (b) comprising the receipt, by the authentication module, of an activation request for the transaction module targeted by the transaction request, said activation request being transmitted by said management module.

The present method is used cleverly with a "wallet"-type management module facilitating the implementation of transactions by the user.

the step (b) comprises the prior transmission by the targeted transaction module, to the management module, of a request for presentation of the associated confidential code. The management module thus allows the implementation of the authentication module as a "wallet companion" without having to modify the transaction modules.

the management module is configured to request and obtain, via the interface, said authentication code.

In particular, the management module can simply control the authentication module by replacing the request for presentation of the confidential code with a request for presentation of the authentication unique code, and doing so in a completely transparent manner.

said activation request comprises an identifier of the targeted transaction module, and the authentication code obtained via the interface;

the step (c) comprises the transmission by the authentication module of the confidential code associated with the targeted transaction module in response to the activation request.

the step (c) also comprises the receipt by the targeted transaction module of the associated confidential code.

In this first mode, the authentication module provides the confidential code to the targeted transaction module so as to simulate a conventional operation.

the step (b) comprises the receipt by the authentication module of an activation request for the transaction module targeted by the transaction request, said activation request being transmitted by said targeted transaction module.

the authentication module is configured to request and obtain, via the interface, said authentication code.

In this second mode, the authentication module and the transaction module communicate only within the security element, thereby physically preventing any attack aiming to intercept the code requests.

the step (b) comprises the transmission by the authentication module of an activation command for the targeted transaction module in response to the activation request.

In this third mode, the authentication module fully controls the transaction module, thereby making it possible to avoid the complexity (and therefore the security hazards) associated with a communication within the mobile OS.

the targeted transaction module is associated with a bank card, the transaction request being received in the step (a) from an electronic payment terminal in wireless communication with the terminal, the transaction authorization being transmitted in the step (c) to the electronic payment terminal.

the method further comprises a step (d) for sending the transaction authorization to a bank server associated with said bank card via a network.

A mobile terminal configured in NFC mode can simulate a bank card having the same functionality. It is sufficient for the user to place the terminal thereof on the EPT in order to authorize a payment with the computerized card.

the security element is chosen from a subscriber identification card and an execution secure space of the data processing module of the terminal.

These security elements are very common on mobile terminals, and very reliable.

the method comprises the prior implementation of a digitization of at least one electronic card, comprising the implementation of steps, by the security element, of:
  receiving, from a server, data representing said electronic card, said data comprising one confidential code per transaction module, so as to install the transaction module(s) suitable for authorizing a transaction on behalf of said electronic card;
  receiving, by the authentication module from the server, said confidential code and an identifier of the installed transaction module;
  associating, by the authentication module, the confidential code with said installed transaction module, and storage.

Such a digitization is reliable and does not require any intervention by the user. The latter can then directly use the authentication module.

the method comprises, prior to receiving from the server, data representing said electronic card:
  the transmission, by the management module to the server, of a request for digitizing at least one electronic card comprising at least one identifier of said electronic card;
  the generation, by the server, of the data representing said electronic card.

In the embodiment using a wallet-type management module, the latter can be responsible for the automatic configuration of the wallet companion, with optimum security.

According to a second aspect, the invention relates to a security element on which a plurality of transaction modules is stored, each transaction module being associated with an electronic card, and suitable for authorizing a transaction on behalf of said electronic card when the transaction module is activated upon presentation of an associated confidential code, the security element being configured to:
  receive a transaction request targeting a transaction module of said plurality;
  receive, at an authentication module also stored on the security element, a valid unique authentication code obtained via an interface of a terminal, the authentication module storing the confidential codes associated with each of the transaction modules, and being itself activatable upon presentation of said authentication code;
  activate, by means of the authentication module, the targeted transaction module, and for transmission of a transaction authorization in response to said transaction request.

According to other advantageous and non-limiting features, the mobile terminal is proposed which comprises a data processing module and the security element according to the second aspect.

According to a third aspect, the invention relates to a computer program product comprising code instructions for executing a method according to the first aspect of the invention for implementing a transaction from a mobile terminal.

According to a fourth aspect, the invention relates to a storage means readable by computer equipment on which this computer program product is located.

PRESENTATION OF THE FIGURES

Other features and advantages of the present invention will become apparent upon reading the following description of a preferred embodiment. This description will be given with reference to the appended drawings, in which.

DETAILED DESCRIPTION

Architecture

Figure 1:
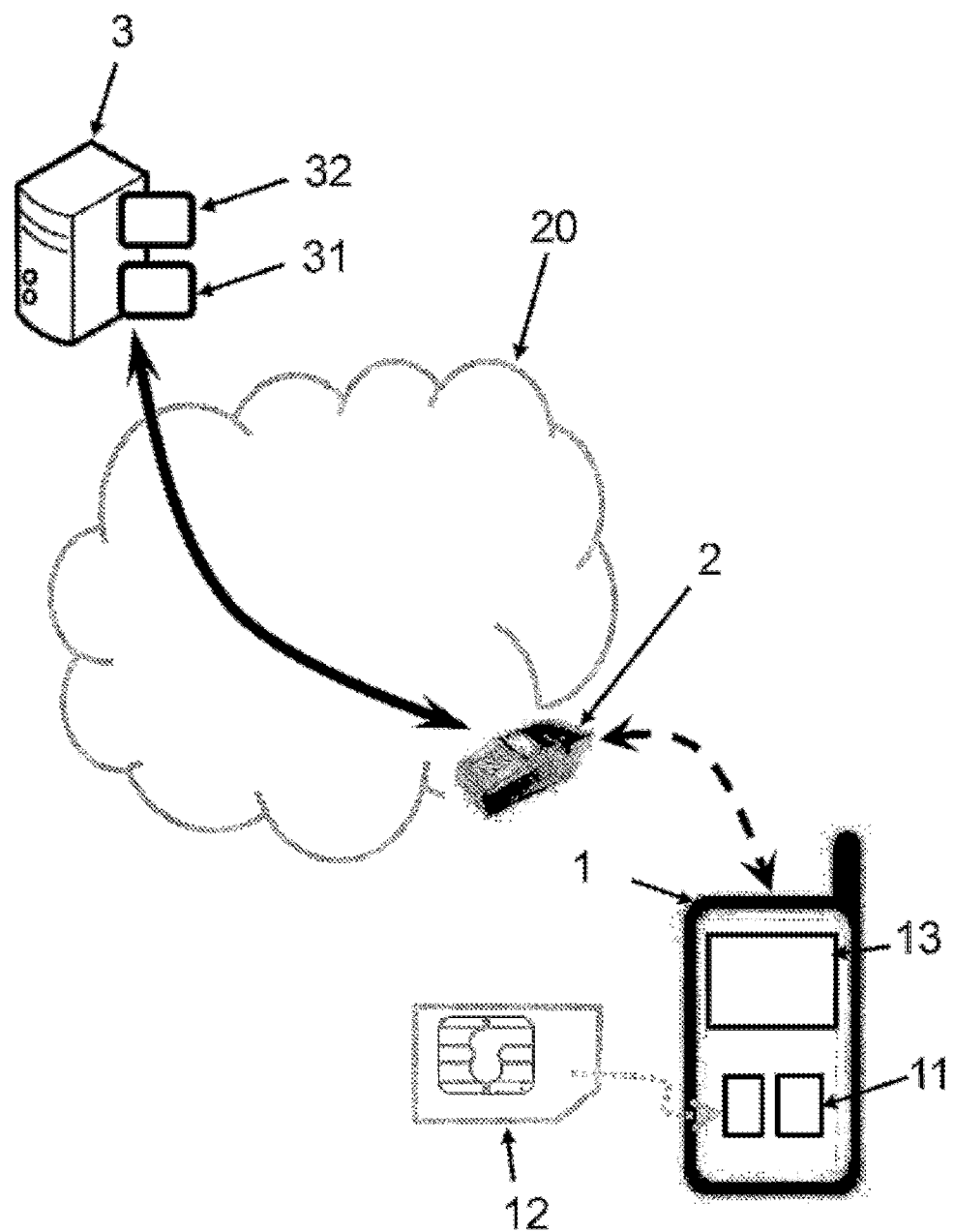
FIG. 1 is a diagram of a network general architecture for implementing the invention.

With reference to FIG. 1, the invention proposes a method for implementing a transaction from a mobile terminal 1, in particular a transaction using a card computerized on the terminal 1, i.e. a transaction imitating the use of an electronic card. The associated prior method of computerizing the electronic card on the terminal 1 will also be seen later.

The transaction is typically a payment transaction (that is to say that the card computerized on the terminal 1 is a bank card), in particular a proximity transaction initiated by an electronic payment terminal (EPT) 2 as found in most points of sale (for example of the EFTPOS type). EPTs indeed mainly have near field communication (NFC) means originally intended to interact with a physical bank card having this technology, but also allowing them to interact with the mobile terminal 1.

The EPT 2 is therefore advantageously firstly connected via a wireless link (NFC, but also Wi-Fi or Bluetooth) to the mobile terminal 1, and secondly connected to at least one bank server 3 via a network 20 (for example the Internet).

Alternatively, the payment can be at a distance (i.e. not near field communication with an EPT 2), the mobile terminal 1 being able, for example, to be connected via the Internet (thanks to a mobile communication network, typically 4G) to remote payment equipment.

However, it will be understood that the present method is not limited to payment transactions, but can relate to any transaction imitating the use of an electronic card on the terminal 1, and in particular teletransmissions of medical claim forms via the French health insurance card, Carte Vitale, validations of medical procedures via the French health professional card, Carte de Professionnel de Santé, secure sending of documents online (for example, filing a patent application using an EPO attorney smart card), etc.

The remainder of the present application will take the example of the payment transaction, and a person skilled in the art will be able to transpose it for other uses.

The mobile terminal 1 can be of any type, in particular smartphone or tablet computers. It comprises a data processing module 11 (a processor), a data storage module 12, a user interface (MMI) 13 comprising, for example, input means and display means (for example a touch screen, and other alternatives will be seen later).

The terminal 1 further comprises a security element 12. Preferably, it is an element suitable for authorizing a connection of the terminal 1 to a mobile communication network, in particular a subscriber identification card. "Subscriber identification card" means any integrated circuit capable of providing the functions of identifying a subscriber to a network via data stored therein, and especially a "SIM" ("Subscriber Identity Module") card, or an "e-UICC" (meaning "(embedded)-Universal Integrated Circuit Card") comprising data processing means in the form of a microcontroller and of the "EEPROM" (meaning "Electrically-Erasable Programmable Read-Only Memory") or flash type memory. The invention is not limited to this type of security module. Thus, in another exemplary embodiment, the security module 12 is a secure memory area of the mobile terminal like a "TEE" ("Trusted Execution Environment") component embedded in the data processing module 11, or a dedicated hardware element of the terminal 1 (for example a microcontroller, an "eSE", meaning "(embedded)-Secure Element" chip or any "Secure Component GP (GlobalPlatform)"), or a removable component of microSD ("SD" meaning Secure Digital) type.

The server 3 of the network 20 designates a transaction management platform, and comprises a data processing module 31, for example a processor and a data storage module 32 such as a hard disk or preferably an HSM (meaning "Hardware Security Module").

As will be seen later, it will be understood that the notion of "server 3" can include a plurality of separate bank servers connected and suitable for communicating with each other.

Security Element

In a known manner, a plurality of transaction modules is stored on the security element 12, each transaction module being associated with an electronic card (i.e. one or more transaction modules form a computerized version of the electronic card), and suitable for authorizing a transaction on behalf of said electronic card when the transaction module is activated upon presentation of an associated confidential code. More specifically, the transaction modules are advantageously organized into one or more sets each representing an electronic card. In other words, each set groups together the transaction modules associated with the same electronic card.

In the case of payment transactions, the electronic cards are bank cards, and the sets of transaction modules form "tokens" as stated, each token thus representing a bank card. The remainder of the present description will take the example of token modules.

In the case of other types of transactions, other types of electronic cards can be computerized, and generally any smart card enabling a strong authentication, i.e. the possession of which, associated with the knowledge of a confidential code, makes it possible to validate the identity of the user and the authorization thereof to perform an action.

Generally, a transaction module contains (among others):
an identifier of the computerized card,
where applicable, an additional code (for example the visual cryptogram),
a confidential code.

A transaction module which is part of a token, once installed (see later), has an identifier that can be applied in two parts: a prefix designating the origin of the instance (Visa®, CB®, Mastercard®, Amex®, etc.) and a unique suffix.

The present solution is different in that there is also stored, on the security element 12, an authentication module storing the confidential codes associated with each of the transaction modules, and being itself activatable upon presentation of an authentication code.

More specifically, the authentication module is a "fob" containing the confidential codes, which acts as a broker with respect to the transaction modules. As will be seen, this allows completely secure management of a plurality of transaction modules with a single key, including transaction modules with different operations: the various confidential codes can have different lengths, different specifications, etc.

In addition, it makes it possible to avoid, for example, any risk of blocking a transaction module in the event of three wrong codes: indeed, the authentication module cannot get a code wrong. If the user gets an authentication code wrong, then the authentication module can be blocked, and this does not require the card to be redone (no transaction module is blocked): it is sufficient, for example, to go into the store of the operator and present an identity document for unblocking to be performed according to a very secure mode of remote reset, that is well known to a person skilled in the art.

It is also noted that a security module, such as a subscriber identification card is a trusted physical device that is almost impossible to infect with a Trojan horse, since the installation of applications in these cards is limited to well-identified entities, and controlled by the operator and/or the transmitter of the service in collaboration with the manufacturer of the security element 12.

In a preferred embodiment, the data processing module 11 ("unsecure" processor) of the terminal 1 implements a "wallet"-type management module, that the authentication module 1, then referred to as a "wallet companion", very cleverly supplements. The interactions thereof will be seen later.

Method for Implementing the Transaction

Figure 2:
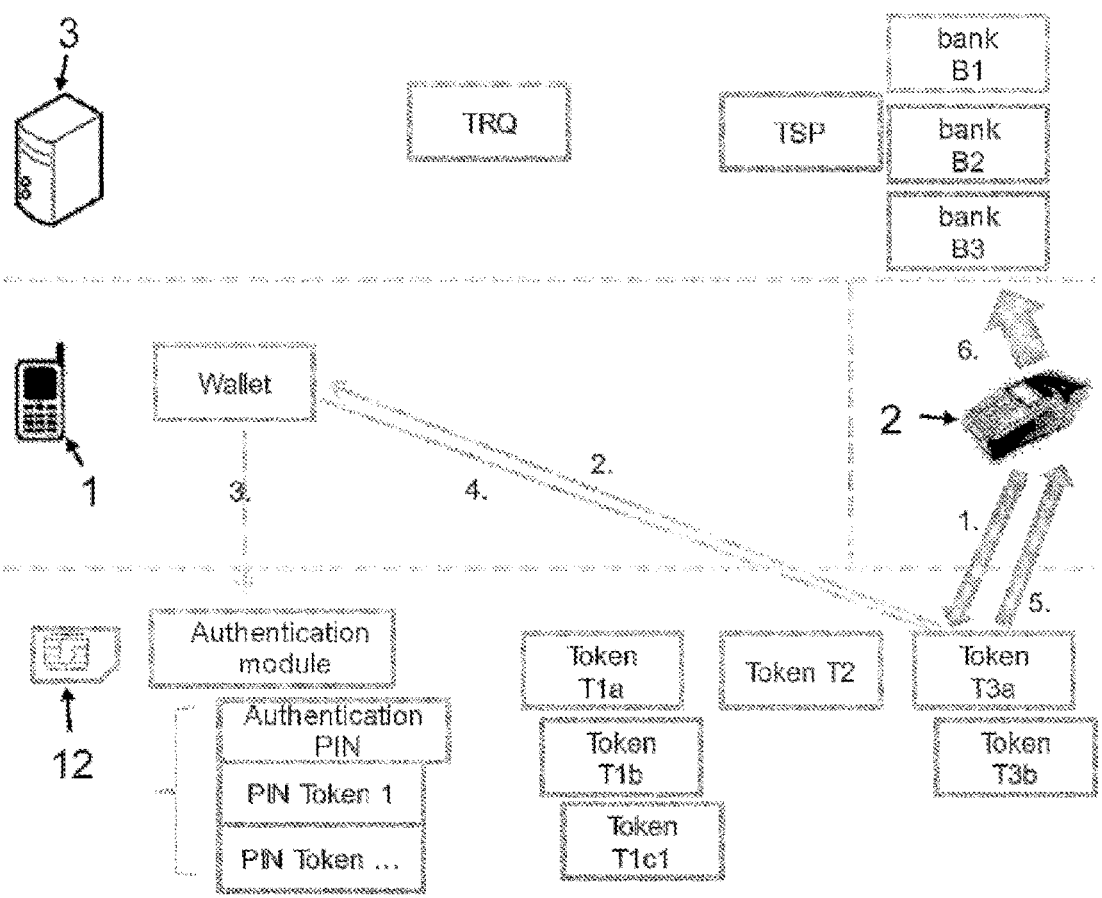
FIG. 2 shows an embodiment for implementing a transaction via the method according to the invention.

With reference to FIG. 2, an exemplary embodiment of the present method according to the invention will be described. It will be understood that this example, in which a user has computerized three cards for a total of six transaction modules, is only illustrative.

In a first step (a), the security element 12 receives a transaction request targeting a transaction module of said plurality, for example transmitted from an EPT 2 connected to the terminal 1, in particular once the user has indicated the desire to implement a transaction via a computerized payment card that the latter has chosen, for example, on the wallet thereof. This step is referenced 1. in FIG. 2.

It is noted that the EPT 2 can, in this step, consult the matrix of the active means of payment, so as to select (using a filter) the instance (the transaction module) which will be responsible for the transaction. For example, assuming that the user has computerized an EMV (Europay, MasterCard, and Visa) card associated with the bank B3, the user can have two associated transaction modules (referenced T3a/T3c), for example associated with Visa® and CB®, respectively. If the EPT 2 is a foreign terminal that accepts only Amex® and Visa®, it chooses the latter and targets the module T3a by transmitting a GPO ("Get Processing Option") specifying the action that it wishes to use (in this case the payment of a given amount).

In a step (b), the authentication module receives the valid unique authentication code obtained via an interface 13 of the terminal 1. This step can be the object of several embodiments.

In a first mode according to FIG. 2 where a wallet is installed on the terminal 1 (and executed via the conventional processing module 11 thereof), i.e. a module for managing the transaction modules, it is this management module which prompts the authentication module by delivering thereto an activation request for the transaction module targeted by the transaction request. Preferably, the communications between the management module and the authentication module (and generally the communications between the management module and all the modules present on the security element 12) are secured (encrypted) so as to prevent any interception or manipulation of the exchanged data.

The step (b) then comprises a prior sub-step 2. for transmission by the targeted transaction module of a confidential code presentation request addressed to the management module (wallet), in a totally natural and usual way.

However, instead of asking the user for the confidential code associated with the transaction module having transmitted the request (as the management module would normally do), the management module asks for the authentication code of the authentication module. In other words, the management module is configured to request and obtain, via the interface 13, said authentication code. It should be noted that the code can be entered directly via a keyboard (in particular a touch-sensitive keyboard) of the interface 13, but also the code can be generated following the verification of the identity of the user on the terminal 1, for example via a fingerprint reader, a voice recognition module, etc. As such, the authentication code can be only a command in a secure form (for example a message containing a key), representing the verified identity of the user, and therefore the authorization to activate the authentication module.

The management module then generates said activation request, the latter advantageously comprising an identifier of the targeted transaction module (received from the latter via the request for presentation of the confidential code thereof), and the authentication code obtained via the interface 13. This is the sub-step 3. shown in FIG. 2.

It is noted that the present embodiment makes it possible to use original transaction modules (as provided by a server 3 for example), the latter not even knowing that they are controlled by an authentication module. It is simply a matter of suitably configuring the management module. As explained, this embodiment supports any requirements of the transaction modules, and in particular varied structures and lengths of confidential codes. No standardization is required.

Alternatively, in a second embodiment, the transaction module and the authentication module can communicate directly, in particular within the secure element 12 (in other words, the authentication module receives the activation request for the transaction module targeted by the transaction request, said activation request being transmitted by said targeted transaction module and replacing the request for presentation of the associated confidential code), this meaning that the authentication module is itself configured to request and obtain said authentication code via the interface 13.

It is noted that hybrid configurations are possible which use a management module through which only some of the requests pass (for example the request for presentation of the confidential code associated with the targeted transaction module, while having the authentication module itself requesting the authentication code thereof).

Upon receiving the valid authentication code (if not, the authentication module returns an error message, and preferably is blocked at the end of three errors), the authentication module is activated, and in a step (c) it activates the authentication module for the targeted transaction module, so that the latter transmits, in fine, a transaction authorization in response to said transaction request.

In the first embodiment, the authentication module transmits the confidential code associated with the targeted transaction module in response to the activation request, either to the wallet-type management module that returns it to the transaction module (sub-step 4. shown in FIG. 2), or directly to the transaction module.

Alternatively (in particular in the second embodiment where the transaction module and the authentication module communicate directly so that there is not necessarily a request for presentation of a code), the authentication module transmits an activation command for the targeted transaction module (rather than the code alone) in response to the activation request, command which comprises, where applicable, the associated confidential code, thereby further improving the security by a notch. Any interception of requests and manipulation of the security element 12 becomes impossible.

The activated transaction module can then finish the implementation of the transaction in a conventional manner. Preferably, in the case of payments, the method further comprises in this respect a step (d) for sending the transaction authorization to a bank server 3 associated with said bank card via the network 20. Typically, in the sub-step 5., the payment authorization is transferred to the EPT 2 so that the latter can report to the server 3 in a sub-step 6.

More specifically, it is generally provided that:
  during the transmission of the GPO, the EPT 2 has kept a context for the transaction and awaits the terminal 1 to be presented again in order to complete the current payment;
  following the entry of the authentication code, the user is invited to present the terminal 1 again to the EPT 2;
  recognizing the terminal 1, the EPT 2 again transmits the same GPO that the unlocked instance (the targeted transaction module presently activated) awaits. This double transmission corresponds to official specifications to ensure the security of the transaction;
  the transaction module can then insert payment information and sign the whole in the response thereof to the EPT 2;
  the EPT 2 can then finish the transaction via the payment servers 3.

Method for Digitizing an Electronic Card

Figure 3:
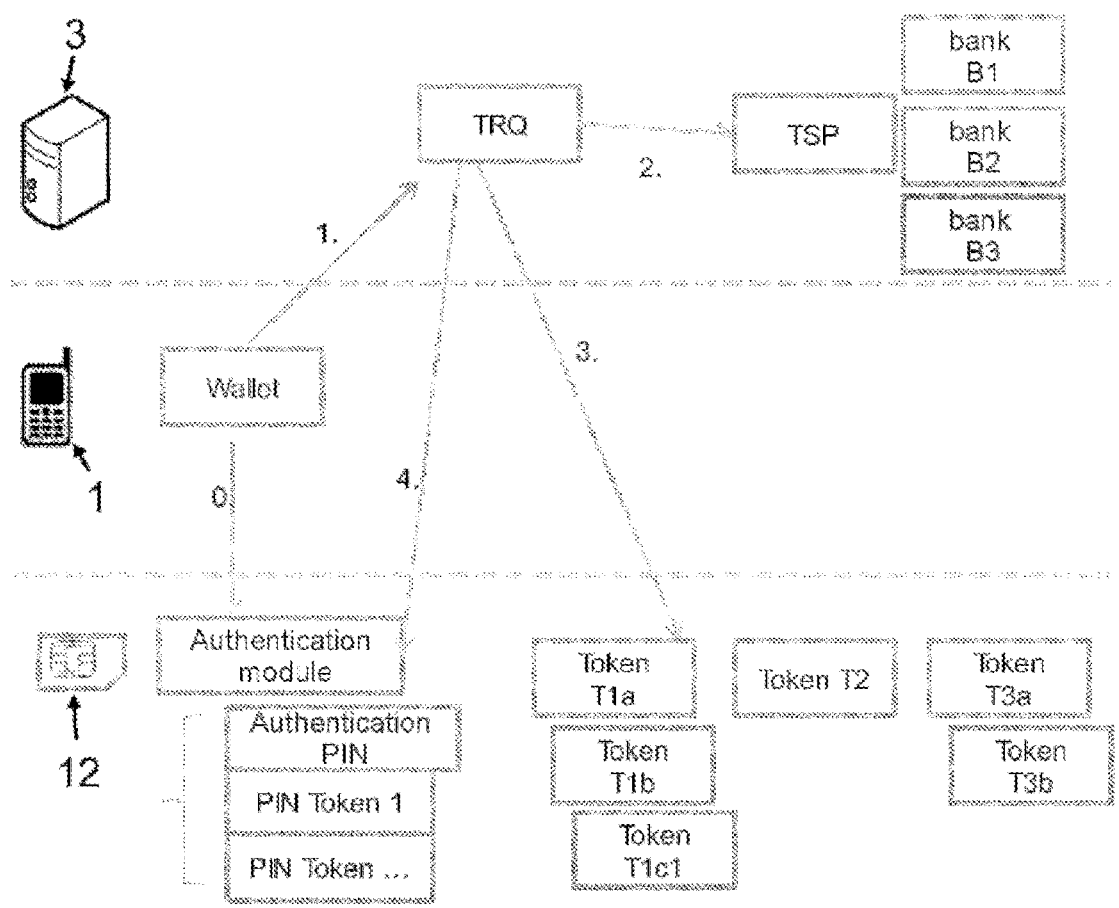
FIG. 3 shows an embodiment for digitizing an electronic card via the method according to the invention.

With reference to FIG. 3, the present invention also relates to a method for digitizing an electronic card advantageously implemented prior to the method for implementing a transaction as described above.

If it is the first card computerized at the terminal 1, this second method can start with a step 0. for initialization by the management module of the authentication module. For example, the user defines the authentication code thereof.

The computerization of a card is advantageously initiated at the management module, which requests from a server 3 the digitizing of at least one electronic card, the associated request comprising at least one identifier of said electronic card.

In the case of bank cards, this step is well known: it is possible, for example, to photograph the physical card. The destination server 3 is more particularly a TRQ, "Token Requestor", which can be, for example, of SPS, "Shared Payment Server", type, shared between several operators (hence the "Shared"). It fulfills the role of requesting tokens, namely that it is appointed by end clients to ask a bank organization to provide thereto a payment virtualized technical means with features that it specifies.

For this purpose, it contacts a TSP (step 1. of the FIG. 3) which is itself in communication with the previously mentioned bank servers. The TSP is a Token Service Provider that is responsible for providing a previously discussed virtualized payment technical means with the asked-for features and a number of usage constraints relating to the security policy that it decides. It is also responsible for analyzing the legitimacy of what is being asked for since it generates the virtualized payment means.

More specifically, on receiving the request to digitize the electronic card, the TRQ contacts the TSP corresponding to the type of card (step 2. of FIG. 3). It helps the TSP to determine the legitimacy of what is being asked for, the latter, where applicable, accepts the computerization, generates data representing said electronic card, and returns the data to the TRQ.

From there, the security element 12 of the terminal 1 implements steps of:
  receiving, from the server 3 (in this case the TRQ), data representing said electronic card, said data comprising one or more confidential code(s) (step 3.), so as to install the transaction module(s) suitable for authorizing a transaction on behalf of said electronic card (i.e. the set of the transaction modules representing the card);
  receiving, by the authentication module from the server 3, said confidential code(s) and an identifier of the installed transaction module(s) (step 4.); and
  associating, by the authentication module, the confidential code(s) with said installed transaction module(s), and storage.

The authentication module is then configured to implement the method for implementing a transaction via the mobile terminal 1, by using the newly computerized card.

Security Element and Terminal

According to a second aspect, the invention relates to the security element 12 for implementing the method according to the first aspect.

A plurality of transaction modules is stored thereon, each transaction module being associated with an electronic card (and the set of transaction modules which are associated with a same card representing said card), and suitable for authorizing a transaction on behalf of said electronic card when the transaction module is activated upon presentation of an associated confidential code.

The security element 12 is configured to:
  receive a transaction request targeting a transaction module of said plurality (and, where applicable, transmit, from the targeted transaction module, a request for presentation of the associated confidential code);
  receive, at an authentication module also stored on the security element 12 (within an activation request also comprising an identifier of the targeted transaction module), a valid unique authentication code obtained via an interface 13 of a terminal 1, the authentication module storing the confidential codes associated with each of the transaction modules, and being itself activatable upon presentation of said authentication code;
  activate, by means of the authentication module, the targeted transaction module, and for transmission of a transaction authorization in response to said transaction request.

Also proposed is the mobile terminal 1 comprising a data processing module 11 and such a security element 12, advantageously in the form of a subscriber identification card, but also in the form of a TEE or an optionally removable external component, etc.

Computer Program Product

According to a third and a fourth aspect, the invention relates to a computer program product comprising code instructions for the execution (in particular on the security element 12 of the terminal 1) of a method according to the first aspect of the invention for implementing a transaction from the mobile terminal 1, and storage means readable by computer equipment (a memory of the security element 12) on which this computer program product is located.

The invention claimed is:

1. A method comprising:
implementing a transaction from a mobile terminal comprising a security element on which a plurality of transaction modules and an authentication module are stored, and a data processing module implementing a management module for managing the transaction modules; each transaction module being associated with an electronic card, and being suitable for authorizing a transaction on behalf of said electronic card when the transaction module is activated upon presentation of an associated confidential code, the authentication module storing the confidential codes associated with each of the transaction modules, and the authentication module being activatable upon presentation of a valid unique authentication code associated with the authentication module, wherein implementing a transaction comprises implementing, by the security element, acts of:
(a) receiving a transaction request targeting a transaction module of said plurality;
(b) the authentication module, an activation request for the transaction module targeted by the transaction request, said activation request being transmitted by said management module;
(c) the authentication module, which is stored on the security element, requesting and obtaining the valid unique authentication code associated with the authentication module via an interface of the terminal;
(d) activating the authentication module upon reception of the valid unique authentication code;
(e) activating, by the activated authentication module, the targeted transaction module, said activating comprising transmitting, by the activated authentication module, the confidential code associated with the targeted transaction module in response to the activation request; and
(f) transmitting, by the targeted transaction module, a transaction authorization in response to said transaction request.

2. The method as claimed in claim 1, comprising, prior to act (c), transmission by the targeted transaction module, to the management module, of a request for presentation of the associated confidential code.

3. The method as claimed in claim 1, wherein said activation request comprises an identifier of the targeted transaction module.

4. The method as claimed in claim 1, wherein the act (f) also comprises receipt by the targeted transaction module of the associated confidential code.

5. The method as claimed in claim 1, wherein the act (e) comprises transmission by the authentication module of an activation command for the targeted transaction module in response to the activation request.

6. The method as claimed in claim 1, wherein the targeted transaction module is associated with a bank card, the transaction request being received in the act (a) from an electronic payment terminal in wireless communication with the terminal, the transaction authorization being transmitted in the act (f) to the electronic payment terminal.

7. The method as claimed in claim 6, further comprising sending the transaction authorization to a bank server associated with said bank card via a network.

8. The method as claimed in claim 1, wherein the security element is chosen from a subscriber identification card and an execution secure space of the data processing module of the terminal.

9. The method as claimed in claim 1, wherein said plurality of transaction modules is organized into one or more sets such that all of the transaction modules of a set are associated with the same electronic card, such that each set of transaction modules represents said electronic card.

10. The method as claimed in claim 1, comprising prior implementation of a digitization of at least one electronic card, comprising implementation of acts, by the security element, of:
receiving, from a server, data representing said electronic card, said data comprising one or more of the associated confidential codes, so as to install the transaction module or modules suitable for authorizing a transaction on behalf of said electronic card;
receiving, by the authentication module from the server, said one or more of the associated confidential codes and an identifier of the installed transaction module or modules;
associating, by the authentication module, the one or more associated confidential codes with said installed transaction module or modules, and storage of the association.

11. The method as claimed in claim 10,
the act (c) comprising receipt, by the authentication module, of the activation request for the transaction module targeted by the transaction request,
and wherein the method comprises, prior to receiving from the server data representing said electronic card:
transmitting, by the management module to the server, a request for digitizing at least one electronic card comprising at least one identifier of said electronic card;
generating, by the server, of the data representing said electronic card.

12. A security element comprising:
a non-transitory computer-readable medium on which a plurality of transaction modules and an authentication module are stored, each transaction module being associated with an electronic card and configured to authorize a transaction on behalf of said electronic card when the transaction module is activated upon presentation of an associated confidential code, the authentication module storing the confidential codes associated with each of the transaction modules, and being activatable upon presentation of a valid unique authentication code associated with the authentication module; and
a processor configured to:
receive a transaction request targeting a transaction module of said plurality;
receive, at the authentication module, an activation request for the transaction module targeted by the transaction request, said activation request being transmitted by a management module managing the transaction modules;
request and obtain, at the authentication module stored on the security element, the valid unique authentication code associated with the authentication module via an interface of a terminal;
activate the authentication module upon reception of the valid unique authentication code;
activate, by using the activated authentication module, the targeted transaction module, said activation comprising transmitting, by the activated authentication module, the confidential code associated with the targeted transaction module in response to the activation request; and
transmit, by the targeted transaction module, a transaction authorization in response to said transaction request.

13. A mobile terminal comprising a data processing module and the security element as claimed in claim 12.

14. A non-transitory computer-readable medium on which is stored a computer program product comprises code instructions for executing a method for implementing a transaction from a mobile terminal when the instructions are executed by a security element of the mobile terminal, the mobile terminal comprising the security element on which a plurality of transaction modules and an authentication module are stored, and a data processing module implementing a management module for managing the transaction modules, each transaction module being associated with an electronic card, and suitable for authorizing a transaction on behalf of said electronic card when the transaction module is activated upon presentation of an associated confidential code, the authentication module storing the confidential codes associated with each of the transaction modules, and being activatable upon presentation of a valid unique authentication code associated with the authentication module, the instructions configuring the security element to perform acts comprising:

receiving a transaction request targeting a transaction module of said plurality;

receiving, by the authentication module, an activation request for the transaction module targeted by the transaction request, said activation request being transmitted by said management module;

requesting and obtaining, by an authentication module also stored on the security element, the valid unique authentication code associated with the authentication module via an interface of the terminal;

activating the authentication module upon reception of the valid unique authentication code;

activating, by the activated authentication module, the targeted transaction module, said activation comprising transmitting, by the activated authentication module, the confidential code associated with the targeted transaction module in response to the activation request; and transmitting, by the targeted transaction module, a transaction authorization in response to said transaction request.

* * * * *